Figure 3:
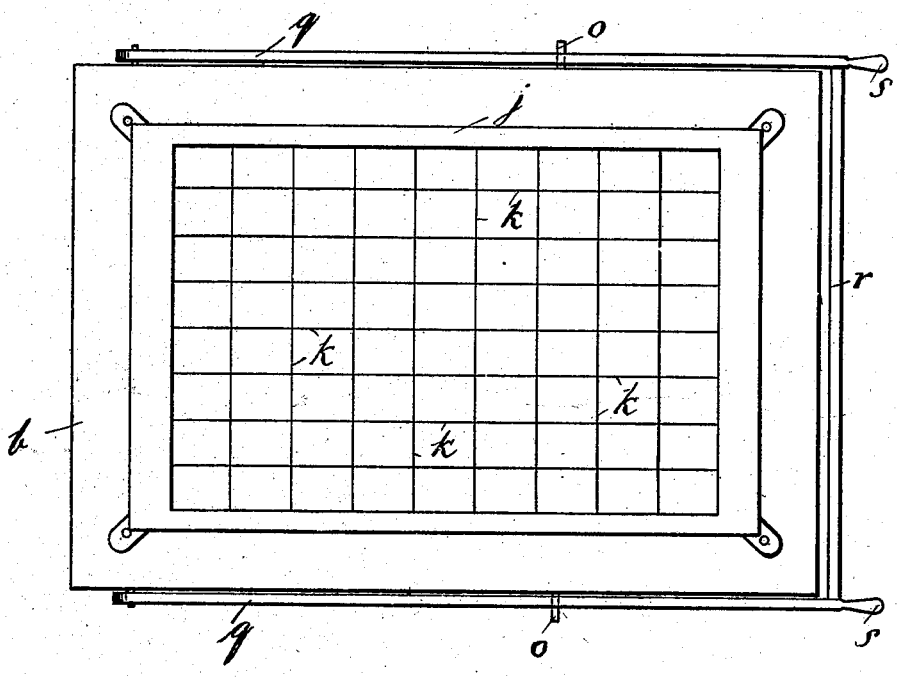

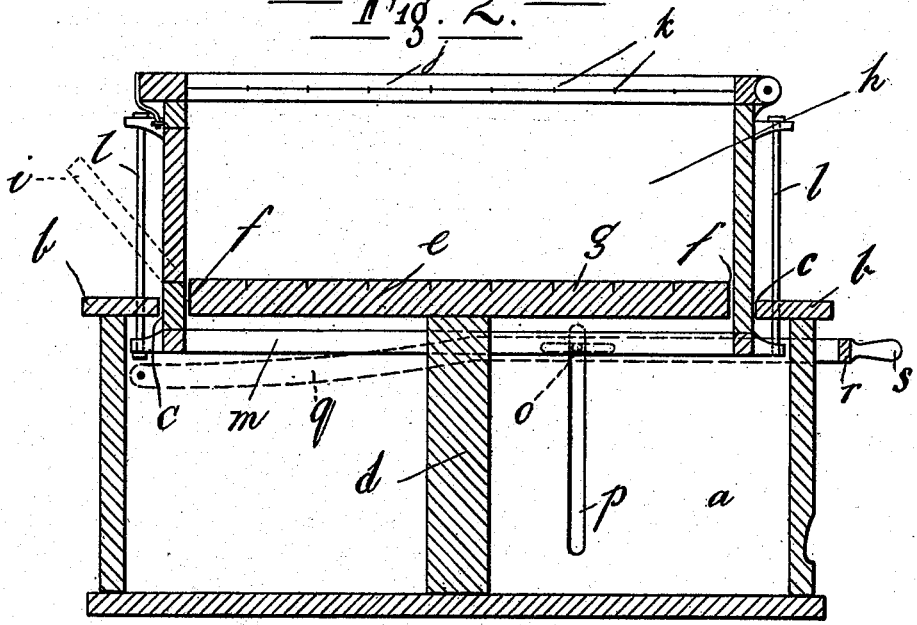
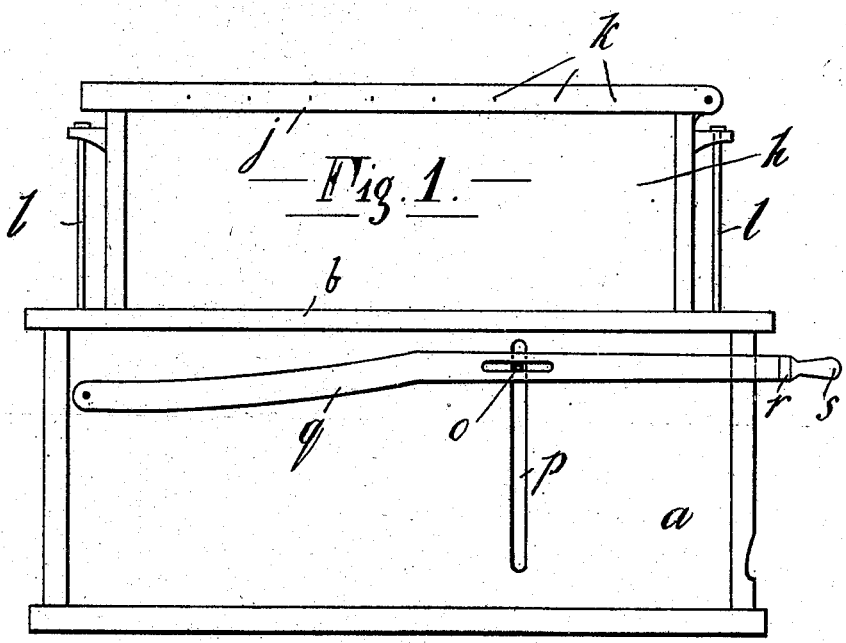

M. LEEN.
MACHINE FOR SLICING BUTTER.
APPLICATION FILED APR. 8, 1907.

900,107.

Patented Oct. 6, 1908.
2 SHEETS—SHEET 2.

UNITED STATES PATENT OFFICE.

MAURICE LEEN, OF TRALEE, IRELAND.

MACHINE FOR SLICING BUTTER.

No. 900,107.  Specification of Letters Patent.  Patented Oct. 6, 1908.

Application filed April 8, 1907. Serial No. 367,069.

*To all whom it may concern:*

Be it known that I, MAURICE LEEN, of Tralee Creamery, Church street, Tralee, in the county of Kerry, in that part of the United Kingdom called Ireland, accountant, have invented certain new and useful Improvements in Machines for Slicing Butter, (for which I have applied for a patent in England No. 4,721, bearing date February 27, 1906;) and I do hereby declare that the following is a full, clear, and exact description of the same.

This invention relates to improvements in machines for slicing butter, and in carrying it into effect I proceed in or in about the following manner making reference to the accompanying drawing wherein:—

Figure 1. shows a side view Fig. 2. a vertical section, and Fig. 3. a plan of a machine made in accordance with my invention.

$a$ is a box-like base open at the top and surrounded by an over-hanging ledge $b$ leaving an aperture $c$ in which is supported on an upright $d$ a board or slab $e$ smaller than the opening $c$ so as to leave a surrounding slot $f$. The board $e$ is so supported that its upper surface shall stand above the upper surface of the ledge $b$ as shown at $g$.

In the slot $f$ is free to slide up and down a frame $h$ one side $i$ of which is hinged to fall down, and to the top $h$ is another frame $j$ having hinged cross wires $k$ so placed as regards one another as to divide the butter into portions of the required size when passed downwards through it.

To insure the wires $k$ passing entirely through the butter corresponding cuts are provided in $e$ for the wires to enter after passing through the said butter.

The frame $h$ has four supports $l$ which slide freely in holes provided for then in the ledge $b$, and to keep the frame $j$ shut a suitable catch is provided. The supports $l$ are connected with a bottom frame $m$ which on opposite sides has the pins $o$ outstanding through slots $p$ in the sides of the base $e$, the outer ends of the pins $o$ being also free to run in the slotted side levers $q$ pivoted at one end to the base $a$, the other ends of $q$ being connected by a bar $r$ furnished with a handle $s$ by which the side levers $q$ can be moved up and down.

In use the frame $h$ is raised above the top of the board $e$ and its hinged side opened or the frame $j$ opened on its hinge, so as to allow the butter to be placed on the board $e$. The hinged side of $h$ is then closed and the frame $j$ also if it has been opened, and by operating the levers $q$ by the handle $s$ or other means provided so as to lower the frame $h$ the cross wires on $j$ pass through the butter and divide it into pieces of the required size, which can now be removed from the board $e$.

Frames $h$ may be provided having cross wires at various distances apart and made interchangeable to enable them to be substituted for one another when the butter is to be cut into pieces of different sizes.

What I claim as my invention and desire to secure by Letters Patent is:—

In a butter slicing machine, the combination of a box-like base having a board supported within it so that its upper surface is above the top of the box-like frame a frame slidable within the box-like base, a wire crossed frame hinged to the said slidable frame, pins outstanding from the bottom of the slidable frame and projecting through slots in the box-like base, slotted levers to receive the ends of the pins, and pivoted to the box-like base, and means for raising and lowering the said slotted levers and the slidable frame connected thereto, substantially as hereinbefore described.

In testimony whereof I have signed my name to this specification in the presence of two subscribing witnesses.

MAURICE LEEN.

Witnesses:
JAMES MOLYNEEU MURPHY,
MATTHEW MCMAHON.